(12) United States Patent
Hao

(10) Patent No.: US 10,902,998 B2
(45) Date of Patent: Jan. 26, 2021

(54) ELECTRONICALLY CONTROLLED TRANSFORMER

(71) Applicant: Long Long Hao, Ordos (CN)

(72) Inventor: Long Long Hao, Ordos (CN)

( * ) Notice: Subject to any disclaimer, the term of this patent is extended or adjusted under 35 U.S.C. 154(b) by 0 days.

(21) Appl. No.: 16/563,938

(22) Filed: Sep. 9, 2019

(65) Prior Publication Data
US 2020/0082978 A1 Mar. 12, 2020

(30) Foreign Application Priority Data

Sep. 11, 2018 (CN) .......................... 2018 1 1058692

(51) Int. Cl.
*H01F 27/42* (2006.01)
*H02M 1/10* (2006.01)
*H02M 1/00* (2006.01)

(52) U.S. Cl.
CPC ............ *H01F 27/425* (2013.01); *H02M 1/10* (2013.01); *H02M 2001/0093* (2013.01)

(58) Field of Classification Search
CPC .. H02M 1/10; H02M 2001/0093; H02M 1/00; H01F 27/425; H01F 27/42
See application file for complete search history.

(56) References Cited

U.S. PATENT DOCUMENTS

| | | | |
|---|---|---|---|
| 2005/0209801 A1* | 9/2005 | Hashimoto | G01R 31/31924 702/64 |
| 2011/0101929 A1* | 5/2011 | Maedako | H02P 9/305 322/24 |
| 2011/0205770 A1* | 8/2011 | Isogai | H02M 1/32 363/78 |
| 2014/0051292 A1* | 2/2014 | Weaver, Jr. | H01R 29/00 439/620.21 |
| 2016/0006478 A1* | 1/2016 | Bruchner | H04J 3/0611 375/150 |
| 2016/0322834 A1* | 11/2016 | Carpenter, Jr. | H02J 7/00 |
| 2018/0342932 A1* | 11/2018 | Wachter | B25F 5/008 |

* cited by examiner

*Primary Examiner* — Jue Zhang
*Assistant Examiner* — Trinh Q Dang

(57) ABSTRACT

An electronically controlled transformer, which is used for AC power supply, cutting off the sinusoidal waveform of voltage to change the RMS voltage. The electronically controlled transformer comprises a casing, socket holes and socket tabs for output and a circuit board. The circuit board is provided with an input terminal, a silicon controlled rectifier or field-effect transistor, an output terminal and a control module. The live wire and neutral wire of input terminal are connected by a rectifier or bridge rectifier. The positive output of rectifier or bridge rectifier is connected to a voltage regulation module. The voltage regulation module is connected to a control module. The control module comprises a control IC and a trigger and driving part. The trigger and driving part has an optical coupler. The switching pin of control IC is connected to the transmitting terminal of optical coupler.

7 Claims, 4 Drawing Sheets

ELECTRONICALLY CONTROLLED TRANSFORMER

BACKGROUND OF INVENTION

1. Field of the Invention

The present invention relates generally to the technical field of electronics and power, and more particularly to an electronically controlled transformer.

2. Description of Related Art

The transformer is an extensively used transform equipment. The existing mechanical transformers are mainly made by winding coil round the core, the core has large volume, heavy weight, high energy consumption, low power factor, as well as inconvenient transportation, installation and use. Different switching power supplies (i.e. electronic transformers) are also transform equipment, which can convert AC into DC voltage, and the electronic devices convert frequency and modulate width, and then the transformed high frequency voltage is rectified and filtered to obtain the required DC voltage. However, the aforethe switching power supplies have complex lines and high costs, some cannot work under high power and high current as limited to conditions, devices and circuits; some can work under high current and high power, but they cannot be small and light as limited to the working conditions of devices, they are still large sized and heavy, the defects in the iron core transformer cannot be solved basically.

In view of this, this inventor proposes the following technical proposal.

SUMMARY OF THE INVENTION

The purpose of the present invention is to overcome the deficiencies in the existing technology to provide an electronically controlled transformer.

In order to solve the above problems, the technical scheme of the present invention is described below:

An electronically controlled transformer used for AC power supply, cutting off a sinusoidal waveform of voltage to change the RMS voltage; the electronically controlled transformer comprising: a casing, socket holes and socket tabs for output and a circuit board; the circuit board including an input terminal, a silicon controlled rectifier or field-effect transistor, an output terminal connected to the silicon controlled rectifier or field-effect transistor and a control module for controlling the silicon controlled rectifier on/off or field-effect transistor on/off; wherein a live wire and neutral wire of the input terminal are connected by a rectifier or bridge rectifier; a voltage positive output of the rectifier or bridge rectifier is connected to a voltage regulation module; the voltage regulation module is connected to the control module; wherein the control module includes a control IC and a trigger and driving part; the trigger and driving part includes an optical coupler, and one pin of the control IC is used as switching pin; the switching pin is connected to a transmitting terminal of the optical coupler, one pin of a receiving terminal of the optical coupler is connected to an output of the live wire or neutral wire; another pin of the receiving terminal of the optical coupler is connected to the G pole of the silicon controlled rectifier or field-effect transistor; an anode of the rectifier or bridge rectifier is connected to two or more resistors and to a cathode; one pin of the control IC is used as voltage detection pin, and the voltage detection pin is located between the two resistors.

More particularly, wherein when an AC voltage imported into the input terminal is 220V-250V and a frequency is 50 or 60 Hz, the control IC lags 0.004-0.007 second after 0V, the switching pin of the control IC sends signals to the optical coupler; the receiving terminal of the optical coupler is turned on to drive the silicon controlled rectifier or field-effect transistor to be turned on.

More particularly, wherein when the AC voltage imported into the input terminal is 100V-130V, the frequency is 50 or 60 Hz, and a sinusoidal peak of voltage detected by the voltage detection pin of the control IC is smaller than 200V, the switching pin of control IC sends signals to the optical coupler continuously, or sends a trigger signal to the optical coupler within 0.001 second before and after 0V, the receiving terminal of the optical coupler is turned on to drive the silicon controlled rectifier or field-effect transistor to be turned on.

More particularly, wherein one pin of the control IC is used as a temperature detection pin; the temperature detection pin is connected to the NTC or PTC; when the NTC or PTC temperature detected by the temperature detection pin of control IC is high, the switching pin of the control IC sends signals to the optical coupler after a lag time based on the original signal transmitting time of the switching pin of control IC.

More particularly, wherein the control IC uses the voltage detection pin to detect voltage; when the down-going wave peak voltage of sine wave is 240V-370V, the switching pin of the control IC sends signals to the optical coupler.

More particularly, wherein another pin of the control IC is used as a second trigger control pin, the second trigger control pin is connected to a second optical coupler; the second optical coupler is connected to a field-effect transistor; the field-effect transistor and the silicon controlled rectifier or field-effect transistor are parallel connected in a main line; when the sinusoidal voltage exceeds 0 or within 0.001 second before and after 0, the second trigger control pin of the control IC sends signals to the second optical coupler, and the signals are turned off within 0.005 second.

More particularly, wherein one or more capacitors are connected in parallel to the socket tabs on the main line of current More particularly, wherein a heat sink is disposed in the casing, the silicon controlled rectifier or field-effect transistor is closely attached to the heat sink.

After adopting the above technical solution, the present invention has the following beneficial effects compared with the prior art: the present invention is used for AC power supply, cutting off the sinusoidal waveform of voltage to change the RMS voltage, the control IC 141 cooperates with optical coupler 142 to turn on/off the silicon controlled rectifier or field-effect transistor to control the output voltage, so as to turn off the first half of each half cycle of AC to regulate the output voltage, and to transform voltage. The present invention has simple lines, low cost, small size and light weight, the defects in iron core transformer are solved basically, so that the present invention has very strong marketability.

DETAILED DESCRIPTION OF THE INVENTION

Figure 1:
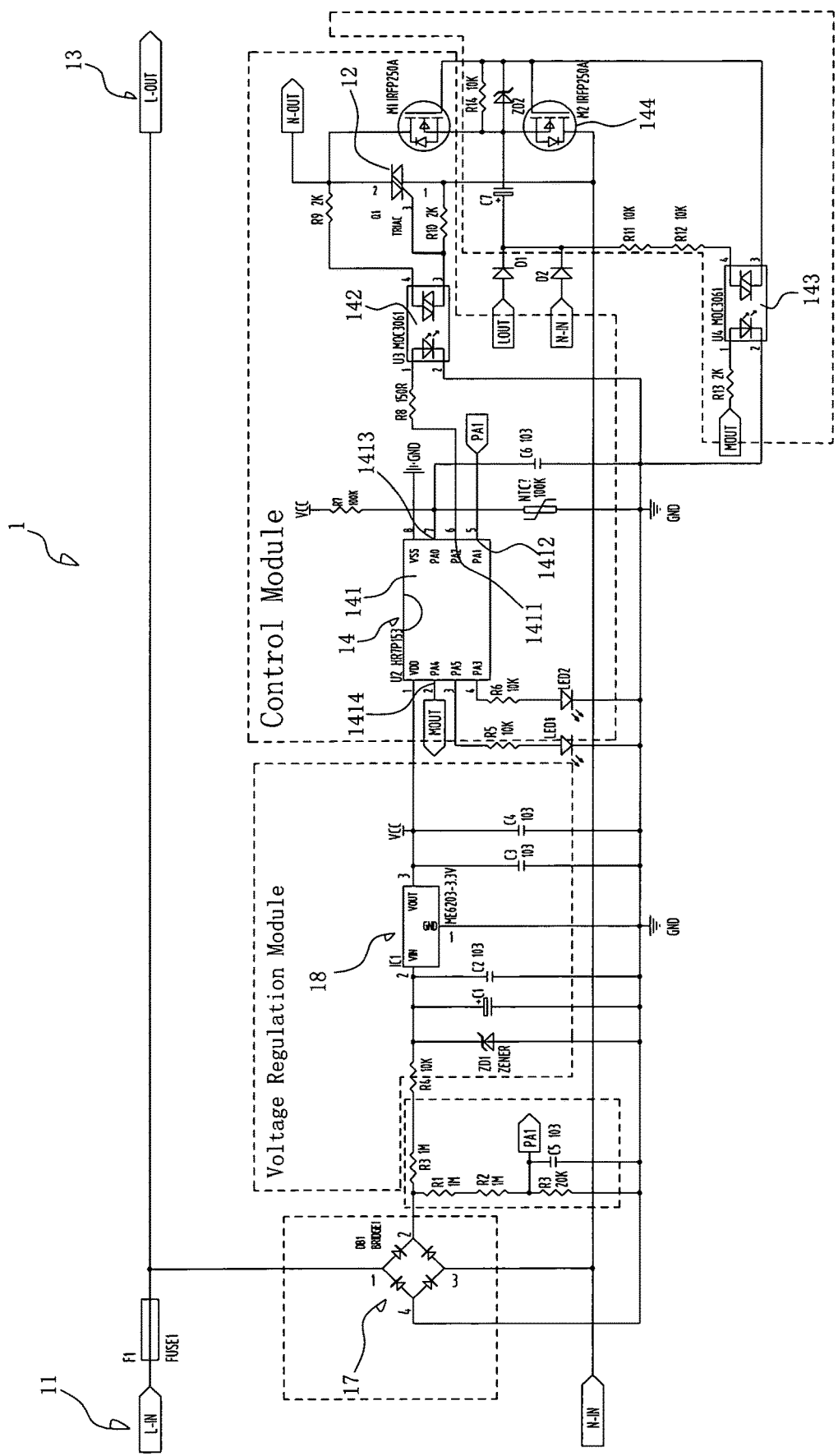
FIG. 1 is a circuit diagram of the present invention.
Figure 2:
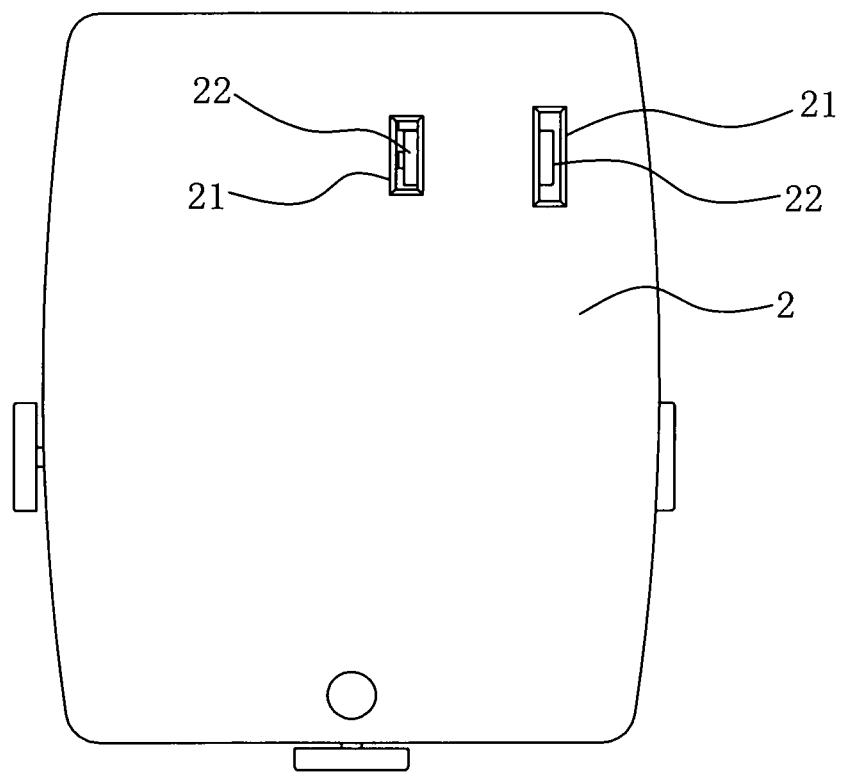
FIG. 2 is a front view of the present invention.
Figure 3:
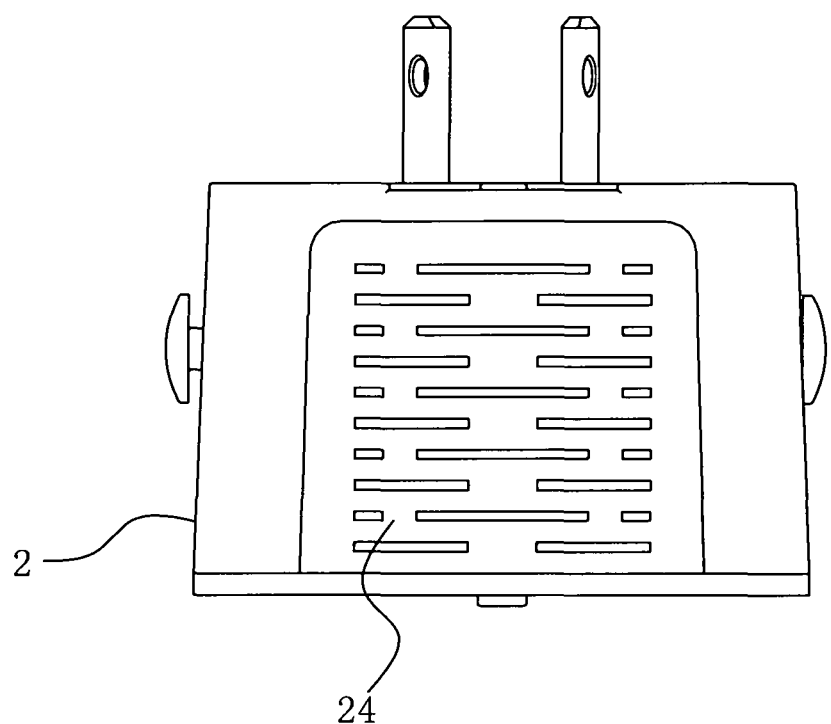
FIG. 3 is a top view of the present invention.
Figure 4:
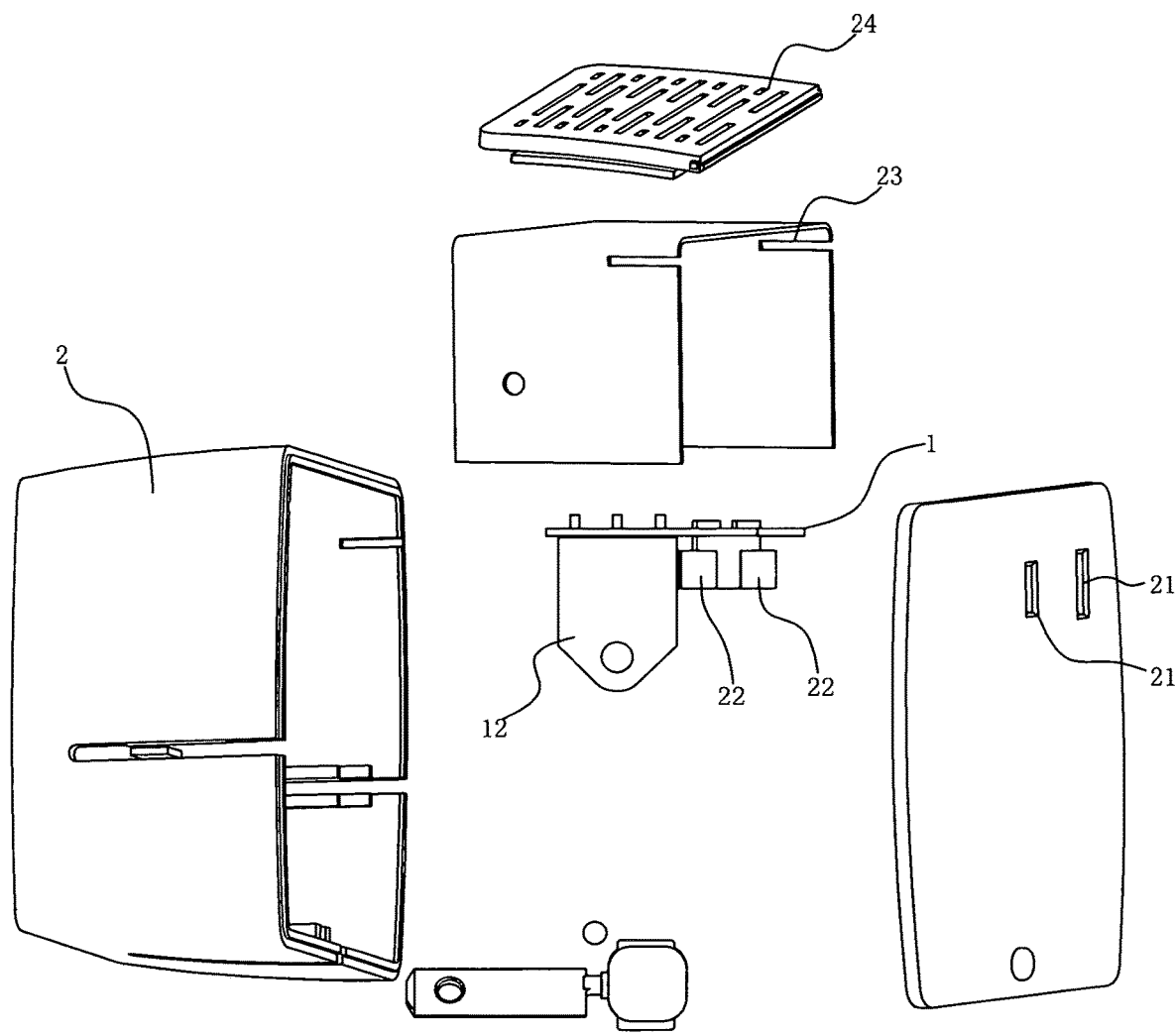
FIG. 4 is an exploded view of the present invention.

FIGS. 1-4 show an electronically controlled transformer, which is used for AC power supply, cutting off the sinusoidal waveform of voltage to change the RMS voltage. The electronically controlled transformer comprises a casing 2, socket holes 21 and socket tabs 22 for output and a circuit board 1. The circuit board 1 is provided with an input terminal 11, a silicon controlled rectifier 12 or field-effect transistor, an output terminal 13 connected to the silicon controlled rectifier 12 or field-effect transistor and a control module 14 for controlling the silicon controlled rectifier 12 on/off or field-effect transistor on/off. The socket holes 21 and socket tabs 22 act as the output terminal 13.

The live wire and neutral wire of the input terminal 13 are connected by a rectifier or bridge rectifier 17. The voltage positive output of the rectifier or bridge rectifier 17 is connected to a voltage regulation module 18. The voltage regulation module 18 is connected to the control module 14. The control module 14 comprises a control IC141 and a trigger and driving part. The trigger and driving part has an optical coupler 142, one pin of control IC141 is used as switching pin 1411. The switching pin 1411 is connected to the transmitting terminal of optical coupler 142, one pin of receiving terminal of the optical coupler 142 is connected to the output of live wire or neutral wire, the other pin of receiving terminal of optical coupler 142 is connected to the G pole of silicon controlled rectifier 12 or field-effect transistor. The anode of the rectifier or bridge rectifier 17 is connected to two or more resistors and connected to the cathode. One pin of the control IC141 is used as voltage detection pin 1412. The voltage detection pin 1412 is located between two resistors. The present invention is used for AC power supply, cutting off the sinusoidal waveform of voltage to change the RMS voltage, the control IC141 cooperates with optical coupler 142 to control the on/off of silicon controlled rectifier or field-effect transistor to control the output voltage, so as to switch off the first half of each half cycle of AC to regulate the output voltage, and to transform the voltage. Moreover, the present invention has simple lines, low cost, small size and light weight, the defects in the iron core transformer are solved basically, so the present invention has very strong marketability.

For the silicon controlled rectifier 12 or field-effect transistor, this embodiment uses silicon controlled rectifier 12 instead of field-effect transistor as switch.

When the AC voltage imported into the input terminal 13 is 220V-250V and the frequency is 50 or 60 Hz, the control IC141 lags 0.004-0.007 second after 0V, the switching pin 1411 of control IC141 sends signals to the optical coupler 142. The receiving terminal of the optical coupler 142 is turned on to turn on the silicon controlled rectifier 12 or field-effect transistor. Alternatively, when the AC voltage imported into the input terminal 13 is 100V-130V and the frequency is 50 or 60 Hz, and the sinusoidal peak of voltage detected by the voltage detection pin 1412 of the control IC141 is smaller than 200V, the switching pin 1411 of control IC141 sends signals to optical coupler 142 continuously, or sends a trigger signal to the optical coupler 142 within 0.001 second before and after 0V. The receiving terminal of the optical coupler 142 is turned on to turn on the silicon controlled rectifier 12 or field-effect transistor. Alternatively, one pin of the control IC141 is used as temperature detection pin 1413. The temperature detection pin 1413 is connected to the NTC or PTC. When the NTC or PTC temperature detected by the temperature detection pin 1413 of control IC141 is high, the switching pin 1411 of control IC141 sends signals to the optical coupler after a lag time based on the original signal transmitting time of switching pin 1411 of control IC141. The lag time can be 0.002-0.005 s. Alternatively, the control IC141 uses the voltage detection pin 1412 to detect voltage. When the down-going wave peak voltage of sine wave is 240V-370V, the switching pin 1411 of the control IC141 sends signals to the optical coupler 142. Alternatively, the other pin of the control IC141 is used as the second trigger control pin 1414. The second trigger control pin 1414 is connected to the second optical coupler 143. The second optical coupler 143 is connected to a field-effect transistor 144. This field-effect transistor 144 and the silicon controlled rectifier 12 or field-effect transistor are parallel connected in the main line. When the sinusoidal voltage exceeds 0 or within 0.001 second before and after 0, the second trigger control pin 1414 of the control IC141 sends signals to the second optical coupler 143, and the signals are closed within 0.005 second.

In the main line of current, the socket tabs 22 are parallel connected to one or more than one capacitor.

There is a heat sink 23 in the casing 2. The silicon controlled rectifier 12 or field-effect transistor adheres to the heat sink. The casing 2 is provided with a cooling orifice plate 24 corresponding to the heat sink 23.

The working method and steps of the present invention are described below.

Step 1, when the power is on, the control IC detects the input voltage and frequency before the silicon controlled rectifier is turned on. The input voltages are 230V and 120V. When the input voltage is 180V to 250V, the default is 230V; when the input voltage is 90V to 150V, the system default is 120V; the frequency is 50 HZ and 60 HZ respectively.

Step 2, when the detected voltage is 230V/50 HZ, the control IC detects the output pulse at 4.8 ms after each half cycle, the pulse time is 1 ms, the control IC uses pulse mode to trigger the silicon controlled rectifier. The silicon controlled rectifier cannot be turned off once it is on, it can be switched off only if the voltage on two terminals is zero, i.e. zero crossing turnoff.

Step 3, when the detected input voltage is 230V/60 HZ, the control IC detects the output pulse at 4 ms after each half cycle, the pulse time is also 1 ms.

Step 4, when the detected input voltage is 120V, no matter the frequency is 50 HZ or 60 HZ, the pulse is delivered at the beginning of each half cycle to turn on the silicon controlled rectifier, the pulse time is 2 ms.

Step 5, when the temperature of silicon controlled rectifier detected by control IC is 105° C., the control IC begins to postpone the turn-on time per half cycle, so as to reduce the output voltage. The temperature of silicon controlled rectifier is detected by detecting the NTC or PTC temperature.

To sum up, the present invention is used for AC power supply, cutting off the sinusoidal waveform of voltage to change the RMS voltage, the control IC141 cooperates with optical coupler 142 to turn on/off the silicon controlled rectifier or field-effect transistor to control the output voltage, so as to turn off the first half of each half cycle of AC to regulate the output voltage, and to transform voltage. The present invention has simple lines, low cost, small size and light weight, the defects in iron core transformer are solved basically, so that the present invention has very strong marketability.

I claim:

1. An electronically controlled transformer used for AC power supply, cutting off a sinusoidal waveform of voltage to change the RMS voltage; the electronically controlled transformer comprising:
   a casing, socket holes and socket tabs for output and a circuit board; the circuit board including an input terminal, a silicon controlled rectifier or field-effect transistor, an output terminal connected to the silicon controlled rectifier or field-effect transistor and a control module for controlling the silicon controlled rectifier on/off or field-effect transistor on/off;
   wherein a live wire and neutral wire of the input terminal are connected by a rectifier or bridge rectifier; a voltage positive output of the rectifier or bridge rectifier is connected to a voltage regulation module; the voltage regulation module is connected to the control module;
   wherein the control module includes a control IC and a trigger and driving part; the trigger and driving part includes an optical coupler, and one pin of the control IC is used as switching pin; the switching pin is connected to a transmitting terminal of the optical coupler; one pin of a receiving terminal of the optical coupler is connected to an output of the live wire or neutral wire; another pin of the receiving terminal of the optical coupler is connected to the G pole of the silicon controlled rectifier or field-effect transistor; an anode of the rectifier or bridge rectifier is connected to two or more resistors and to a cathode; one pin of the control IC is used as voltage detection pin, and the voltage detection pin is located between the two resistors;
   wherein one pin of the control IC is used as a temperature detection pin; the temperature detection pin is connected to the NTC or PTC; when the NTC or PTC temperature detected by the temperature detection pin of control IC is high, the switching pin of the control IC sends signals to the optical coupler after a lag time based on the original signal transmitting time of the switching pin of control IC.

2. The electronically controlled transformer according claim 1, wherein when an AC voltage imported into the input terminal is 220V-250V and a frequency is 50 or 60 Hz, the control IC lags 0.004-0.007 second after 0V, the control IC sends signals to the optical coupler; the receiving terminal of the optical coupler is turned on to drive the silicon controlled rectifier or field-effect transistor to be turned on.

3. The electronically controlled transformer according claim 1, wherein when the AC voltage imported into the input terminal is 100V-130V, the frequency is 50 or 60 Hz, and a sinusoidal peak of voltage detected by the voltage detection pin of the control IC is smaller than 200V, the control IC sends signals to the optical coupler continuously, or sends a trigger signal to the optical coupler within 0.001 second before and after 0V, the receiving terminal of the optical coupler is turned on to drive the silicon controlled rectifier or field-effect transistor to be turned on.

4. The electronically controlled transformer according claim 1, wherein the control IC uses the voltage detection pin to detect voltage; when the down-going wave peak voltage of sine wave is 240V-370V, the control IC sends signals to the optical coupler.

5. The electronically controlled transformer according to the claim 1, wherein another pin of the control IC is used as a second trigger control pin, the second trigger control pin is connected to a second optical coupler; the second optical coupler is connected to a field-effect transistor; the field-effect transistor and the silicon controlled rectifier or field-effect transistor are parallel connected in a main line; when the sinusoidal voltage exceeds 0 or within 0.001 second before and after 0, the second trigger control pin of the control IC sends signals to the second optical coupler, and the signals are turned off within 0.005 second.

6. The electronically controlled transformer defined in according to the claim 1, wherein one or more capacitors are connected in parallel to the socket tabs on the main line of current.

7. The electronically controlled transformer according to the claim 1, wherein a heat sink is disposed in the casing, the silicon controlled rectifier or field-effect transistor is closely attached to the heat sink.

* * * * *